United States Patent [19]

Baer et al.

[11] Patent Number: 4,621,351
[45] Date of Patent: Nov. 4, 1986

[54] BEAM ALIGNMENT SYSTEM

[75] Inventors: James W. Baer, Boulder County; Henry H. Hoshiko, Laramer County; Robert P. McIntosh, Boulder County; Charles M. Reilly, Boulder County; Paul M. Romano, Boulder County; James W. Hargarten, Boulder County, all of Colo.

[73] Assignee: Storage Technology Partners II, Louisville, Colo.

[21] Appl. No.: 628,684

[22] Filed: Jul. 6, 1984

[51] Int. Cl.[4] .............................................. G11B 7/00
[52] U.S. Cl. ...................................... 369/44; 369/46; 369/112
[58] Field of Search ...................... 369/44, 45, 46, 100, 369/111, 112; 250/201, 202; 346/76 L; 365/234, 215

[56] References Cited

U.S. PATENT DOCUMENTS

| 4,074,085 | 2/1978 | Russell | 369/46 |
| 4,167,024 | 9/1979 | Hamisch | 369/46 |
| 4,290,122 | 9/1981 | Bates et al. | 365/234 |
| 4,504,939 | 3/1985 | Eberly | 369/46 |
| 4,571,712 | 2/1986 | Romano et al. | 369/44 |

Primary Examiner—Donald McElheny, Jr.
Attorney, Agent, or Firm—Woodcock Washburn Kurtz Mackiewicz & Norris

[57] ABSTRACT

A beam alignment system and method for aligning a first radiation beam with respect to a second radiation beam as these beams share a desired optical path. Beam steering means, such as a galvonometer controlled mirror, steer the alignment of the first beam as it enters the shared optical path. Detection means are employed to sense the relative alignment between the first and second beams as they travel through the shared path. This sensed alignment is compared to a desired alignment, and a position error signal is generated to indicate the error therebetween. The position error signal, in turn, is used to steer the galvonometer controlled mirror in order to force the beam alignment error between the two beams to zero. In a preferred embodiment, the beam alignment system is used in an optical disk storage system to precisely position a write beam a desired distance from a read beam; thereby allowing a data track written with the write beam on a storage disk to be spaced a desired distance (the track pitch) from a previously written track that is being followed by the read beam.

15 Claims, 12 Drawing Figures

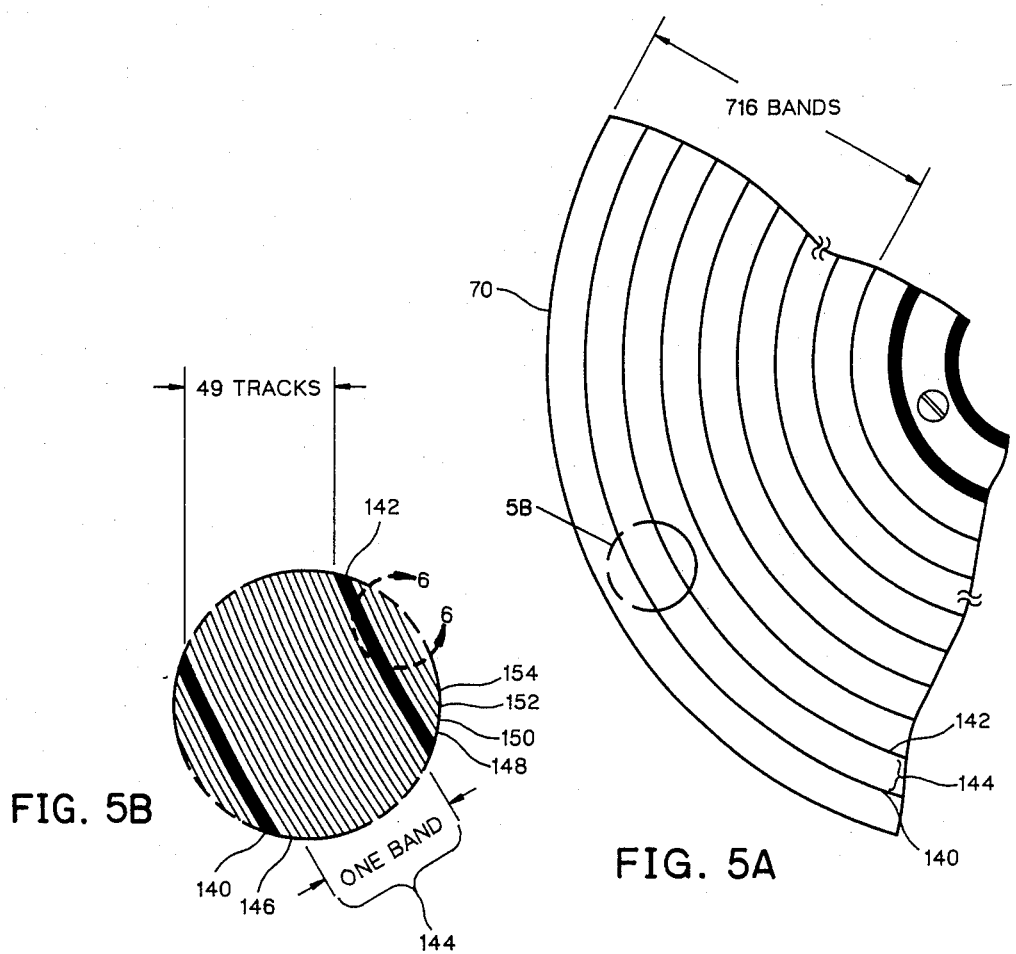
FIG. 5B
FIG. 5A
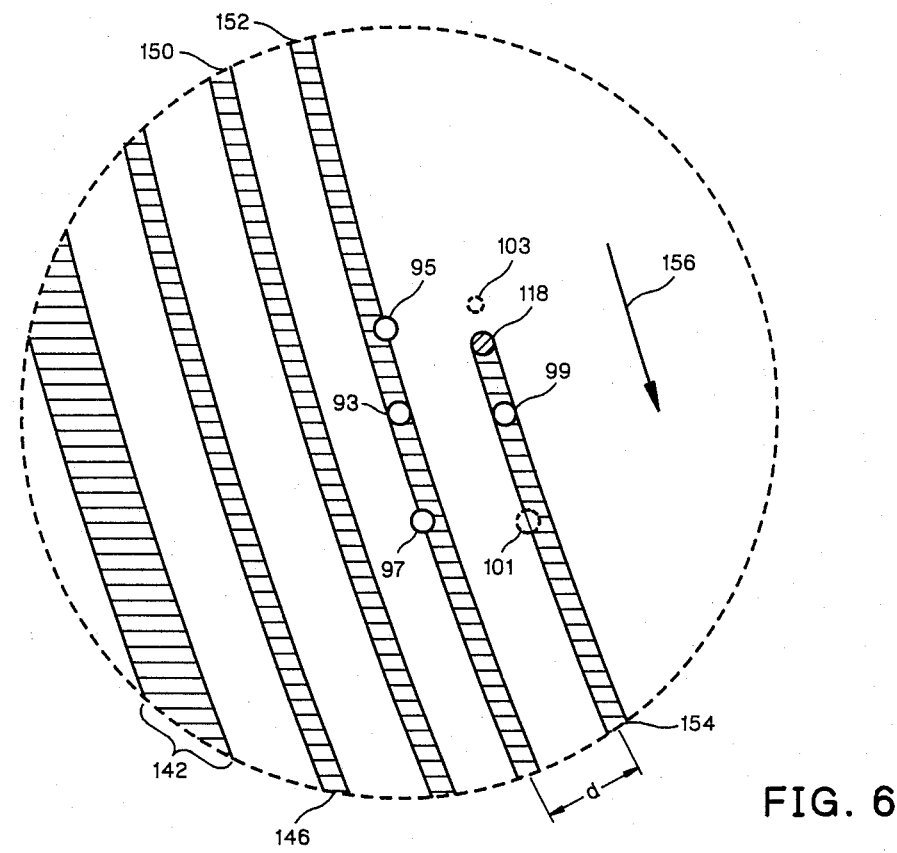
FIG. 6

BEAM ALIGNMENT SYSTEM

BACKGROUND OF THE INVENTION

The present invention relates to beam alignment systems, and more particularly to a beam alignment system that may be used in an optical disk storage system to accurately set and maintain data track pitch.

In an optical disk storage system, data is stored by marking a rotating disk with a beam of radiant energy (typically a laser beam) that is modulated in some fashion by the data to be stored. To write or store data on the disk, the modulated beam is directed to and focused at a desired point (termed the "write point" for purposes of this application) on the surface of the disk. As the disk rotates under the write point, a "data track" is created by the marks made on the disk by the modulated beam. If the write point is held stationary, a circular data track is created centered about the axis of rotation of the rotating disk. Additional data tracks, each concentric with the others, can be created by blanking the write beam off, moving the write point radially with respect to the disk to a new location, holding the write point stationary at this new location, and turning the modulated write beam back on. Alternatively, if the write point is radially moved with respect to the disk as the modulated write beam makes marks thereon, a spiralling data track is created on the surface of the disk.

Whether the data tracks are concentric or spiralling, the available surface area on the disk is most efficiently used when the data tracks are spaced together as close as possible. The radial distance between adjacent data tracks is called the "track pitch". Accurately maintaining the track pitch at a desired value, especially where the track pitch must be kept small so as to efficiently make use of the storage space available on the disk, has presented a significant obstacle in the development of high storage capacity optical disk storage systems.

To read data that has been previously stored or written on the disk, a read beam of radiant energy is directed to a desired data track on the disk. This read beam typically has different parameters associated therewith than does the write beam (such as intensity and/or wavelength), thereby ensuring that the read beam does not mark the disk in the same manner as the write beam is designed to mark the disk. The read beam is either reflected from the surface of the disk, or passes therethrough (if the substrate of the optical disk is sufficiently transparent to allow the beam to pass therethrough), and the intensity of the read beam is modulated in accordance with the data marks that have been previously written in the data track by a write beam. The data marks typically comprise a sequence of reflectivity-high/reflectivity-low (or transmissivity-high/transmissivity-low) marks that modulate the reflected or transmitted read beam in accordance with the pattern of the stored data. Once modulated, the read beam is directed to a suitable optical detector where a modulated data signal is generated. The data is extracted from this signal using conventional demodulation techniques.

Schemes are known in the art (see U.S. Pat. No. 3,876,842) for using a plurality of read beams to read and track a data track written on a flat record carrier, such as an optical disk. It is also known in the art to place a new data track at a "constant distance from the next preceding already recorded data track so that the data tracks are maintained in spaced parallel alignment without crossing each other," U.S. Pat. No. 3,657,707, col. 11, lines 40–43. However, the particular scheme shown in U.S. Pat. No. 3,657,707 for achieving the desired spaced parallel alignment falls short of providing and maintaining an accurate and narrow track pitch of the type required in high data capacity optical storage systems.

SUMMARY OF THE INVENTION

It is an object of the present invention to provide a beam alignment system and method wherein one optical beam is aligned and maintained at a presecribed distance from another optical beam.

It is a further object of the present invention to provide such a beam alignment system and method that can be used within an optical disk storage system to accurately maintain a write beam in a desired alignment with a read beam.

A further object of the present invention is to provide a write alignment servo system and method for use in an optical disk storage system wherein each new data track to be written on a disk thereof is accurately spaced a fixed distance (track pitch) from a previously written data track.

The above and other objects of the present invention are realized in a beam alignment system that maintains a first beam a prescribed distance from a second beam as these beams pass through a desired optical path. The system includes a primary optical path through which a reference beam, e.g., the second beam, is directed. Another beam, e.g., the first beam, is controllably directed to the primary optical path so that the first beam travels therethrough substantially parallel to the second beam, but wherein the alignment between the two beams is controlled by beam steering means applied to the first beam prior to its entry into the primary optical path. Suitable detection means are employed to detect the spacing between the two beams in the primary path. Feedback from this detection means controls the beam steering means applied to the first beam so that the desired spacing between the two beams can be accurately maintained.

When employed within an optical disk storage system, the beam alignment system of the present invention provides a write alignment servo system wherein newly written data tracks on a storage disk used within such a storage system may be spaced a fixed distance or "track pitch" from a previously written track. In such a system, the reference beam (second beam) follows a previously written track using conventional beam tracking techniques. A write beam (first beam) is then positioned at a desired alignment with respect to the read beam in accordance with the beam alignment system described above. Thus, as the two beams pass through the primary path and strike the write point or area on the disk surface, the write beam is positioned a prescribed distance from the previously written track that the read beam is following.

More particularly, in accordance with the write alignment system of the present invention, a previously written data track is read and followed using a suitable beam following technique, such as a 3-spot tracking and reading scheme similar to the concept shown in U.S. Pat. No. 3,876,842. In accordance with this scheme, three read beams are generated and directed to a desired previously written track on the surface of the disk by way of an optical path that includes a first galvonometer controlled mirror. These read beams are spaced apart in a fixed relationship such that the centers of the outer two beams are approximately one track width apart radially at the point where the beams fall upon the disk surface. The first galvonometer controlled mirror forms an element of a tracking servo control loop wherein the angular position of the mirror is controlled to maintain the outer two beams half on and half off of the data track on opposite sides thereof. This spacing and control necessarily causes the third beam to track and follow the center of the data track.

At a suitable point in the optical path through which these read beams are travelling, a beam splitter directs or splits off a portion of the center read beam to a beam alignment detector. This beam alignment detector detects the lateral position of the split-off beam as it falls upon a surface thereof.

A write beam is generated from a write beam radiation source and directed through a second optical path to join the first optical path (the one through which the read beams are travelling) at a point "upstream" from the beam splitter. Included in the second optical path is a second galvonometer controlled mirror that steers the write beam prior to its entering the first optical path. Because both the read and write beams are present in the first optical path at the point where the beam splitter is located, the beam splitter also directs or splits off a portion of the write beam to the beam alignment detector.

The beam alignment detector and associated circuitry detects the difference between the positions of the split off portions of the read and write beams as these beams fall upon the surface of the detector. This position difference is used to generate an error signal that is ultimately used to control the angular position of the second galvonometer mirror, and thus the position of the write beam relative to the read beam in the first optical path. Hence the write beam can be steered by means of the second galvonometer mirror to force the difference between the location of the read and write beams to a desired value, this value being the desired track pitch.

In one embodiment of the invention, a write alignment check is periodically performed wherein the desired distance between the read and write beams is sensed as the beam alignment detector is forced to zero by steering the second galvonometer mirror so that the split off portion of the write beam is effectively placed in fixed relations to the split off portion of the read beam. Prior to allowing this write beam to pass through the optical path to the surface of the disk, however, a corrective offset is added to the steering signal of the second galvonometer mirror, which offset sets the desired track pitch displacement of the write beam. Hence, the offset moves the write beam to one track pitch distance from the previously written track. Advantageously, this offset may be derived from a measured value obtained by measuring the distance between two precision written tracks that are accurately and precisely written on the disk with precision equipment as part of the disk manufacturing process. Hence the "offset" value used will cause a fixed track pitch distance to be realized regardless of any variations that may exist in the various optical paths and optical components used in the particular drive in which the disk is being used.

BRIEF DESCRIPTION OF THE DRAWINGS

The above and other objects, features, and advantages of the present invention will be more apparent from the following more particular description thereof presented in conjunction with the following drawings, wherein:

FIG. 5A is a top view of a portion of a disk used with the optical storage system of FIG. 4 showing coarse servo tracks that are concentrically spaced on the surface of the disk;

FIG. 5B is a schematic view of the portion 5B of the disk of FIG. 5A, showing how data bands and tracks are arranged in relationship to the coarse servo tracks.

FIG. 6 is an enlarged view of the disk surface area bounded by the circular dashed line 6—6 in FIG. 5, and shows how a plurality of read beams are used to follow a previously written data track and how a write beam is used to write a new data track that is a prescribed track pitch distance from a previously written data track;

FIG. 8 is a perspective diagram of all the optical components,

FIG. 9 is a block diagram of the read optics,

FIG. 10 is a block diagram of the write optics, and

FIG. 11 is a block diagram of the coarse seek optics.

DETAILED DESCRIPTION OF THE INVENTION

The following description is of the best presently contemplated mode of carrying out the invention. This description is not to be taken in a limiting sense, but is made merely for the purpose of describing the general principles of the invention. The scope of the invention should be determined with reference to the appended claims.

Figure 1:
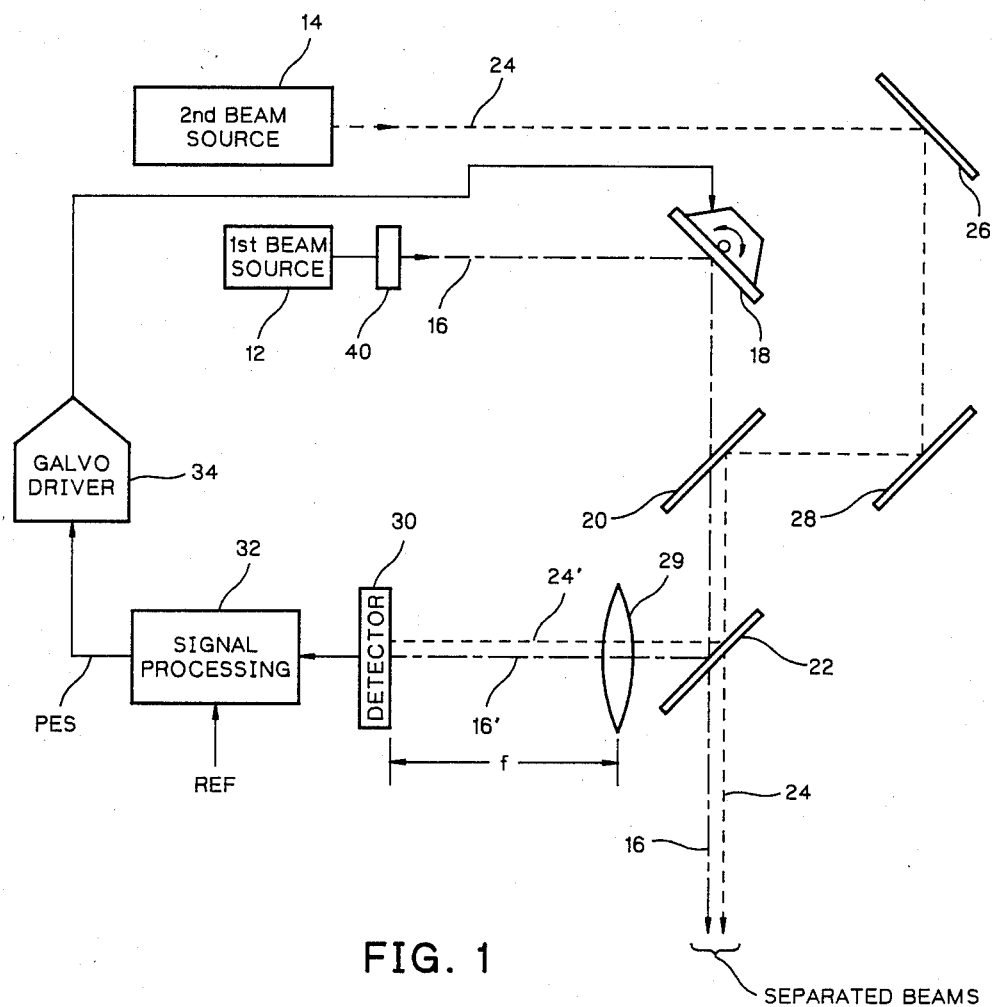
FIG. 1 is a block diagram of the beam alignment system of the present invention.

Referring to FIG. 1, there is shown a block diagram of the beam alignment system of the present invention. A first beam source 12 and a second beam source 14 respectively generate radiation beams that follow the paths indicated. The beam from the first beam source 12 is represented by the dashed single-dot line 16. As indicated in the figure, the beam 16 is reflected off of a galvonometer controlled mirror 18, passes through a beam combiner 20, and a beam splitter 22, and continues along an optical path in the direction indicated. (It is to be understood that in connection with FIGS. 1 and 2, when reference is made to a beam, such as the beam 16, that the path which the beam is following may also be referred to as the optical path 16 along which the beam 16 is travelling.)

The second beam source 14 also generates a beam 24, represented as a dashed line in FIG. 1, which follows a path that reflects off of a mirror surface 26, a mirror surface 28, and a surface of the beam combiner 20. After the beam combiner 20, the path of the beam 24 is substantially parallel to the path of the beam 16, although variations in the angle of the galvonometer controlled mirror 18 may cause the beam 16 to be somewhat out of parallel with the beam 24. However, as those skilled in the art will recognize, the angular displacement of the gavonometer controlled mirror 18 is very slight, and the two beams 16 and 24 are considered to be following the same optical path even though not truly parallel to each other.

As the beam 16 passes through the beam splitter 22, a portion of the beam 16, represented as 16', is split off of the beam 16 and directed to a detector 30 through a lens 29. Likewise, a portion 24' of the beam 24 is split off from the beam 24 as the beam 24 passes through the beam splitter 22. The split off portion 24' is also directed to the detector 30 through the lens 29. The lens 29 is positioned at a distance f from the detector 30 so that both beams are focused thereon. Advantageously, the alignment between the split off beams 16' and 24' is proportional to the alignment of the beams 16 and 24 as these beams pass through the beam splitter 22. This means that the spacing between the beams 16' and 24' at the point where these beams strike the surface of the detector 30 is either the same as, or proportional to, the alignment between the beams 16 and 24 at the point where the beams 16 and 24 pass through the beam splitter 22. Hence, the spacing between the beams 16' and 24' at the surface of the detector 30 will be proportional to the alignment between the beams 16 and 24 anywhere along the common path shared by the beams 16 and 24.

The detector 30 measures the lateral spacing or distance between the two beams 16' and 24'. This distance measurement is processed by signal processing circuitry 32 where an error signal is generated. The error signal represents the difference between the measured beam separation or spacing and a desired beam separating or spacing. As such, the error signal is referred to as a position error signal (PES). After being appropriately amplified and buffered in a galvo-driver 34, the PES is used to steer the galvonometer controlled mirror 18. Conventional servo control techniques are used to drive the PES signal to zero, thereby forcing the beam 16 to assume a desired alignment with respect to the beam 24.

Figure 2:
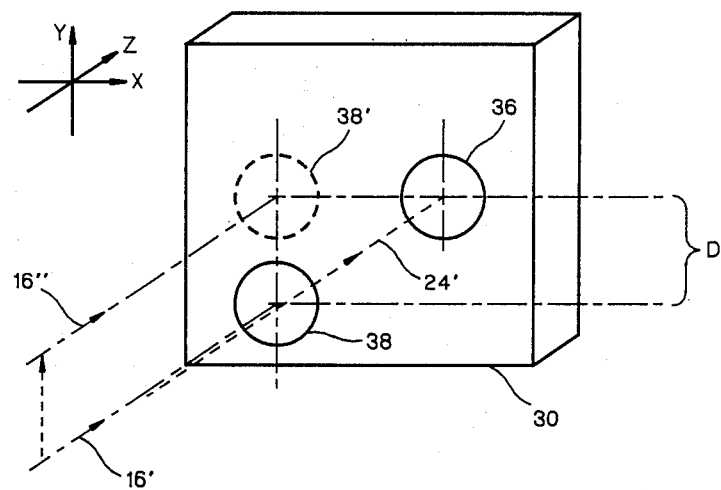
FIG. 2 is a perspective view of the detector of FIG. 1, showing how two beams may be laterally aligned thereon.

Referring to FIG. 2, a perspective view of the front surface of the detector 30 is shown to illustrate how the beam 16' is laterally aligned with the beam 24'. As shown in FIG. 2, the beam 16' strikes the surface of the detector 30 at a spot location 38. Similarly, the beam 24' strikes the detector 30 at a spot location 36. As illustrated in the figure, this spot 38 is not laterally aligned with the spot 36. (For purposes of FIG. 1, laterally aligned means in the Y direction). The detector 30 measures the distance D between the center locations of the spots 38 and 36. The PES signal (FIG. 1) is a signal having a prescribed parameter (amplitude, phase, etc.) that is proportional to the distance D. The galvo-driver 34 responds to this PES signal in order to move the galvonometer controlled mirror 18 in a direction that causes the beam 16' to be deflected in the positive Y direction until the distance D is reduced to zero, thereby indicating lateral alignment between the two beams 16' and 24'. In FIG. 2, the aligned position of the beam 16' is represented as the beam 16" and the spot 38'.

Referring back to FIG. 1, a shutter 40 or other suitable blanking device, may be placed near the first beam source 12 in order to selectively turn the beam 16 on or off. The shutter 40 is typically not an actual shutter that physically blocks 100% of the beam 16 from following its desired path, but is rather a suitable attenuation device that reduces the intensity of the beam 16 below a prescribed threshold value. For many applications of a beam alignment system of the type shown in FIG. 1, it is not feasible nor desirable to place a shutter or equivalent in the path of the beam 24. Thus, the beam 24 remains on all the time, and only the beam 16 can be selectively attenuated with the shutter 40. How such a system (having one beam that is always on) is adapted for use with the beam alignment system of the present invention is explained more fully below in connection with FIG. 3.

The beam intensity and position information included within the signal generated by the detector 30 are not always separate and distinct, but are included within the same signal. Hence, accurate position information can be obtained only when the two beams 16' and 24' fall upon the surface of the detector 30 with the same intensity. Because maintaining two beams from separate sources at precisely the same intensity levels is difficult at best, it is desirable to process the measurement signal from the detector 30 so as to remove the intensity variations therefrom. The process of removing the intensity variations from the detector measurement is referred to as "normalization". The scheme by which normalization is achieved, and by which a true PES signal is obtained for a system wherein one of the beams remains on at all times is illustrated in FIG. 3, discussed below.

Figure 3:
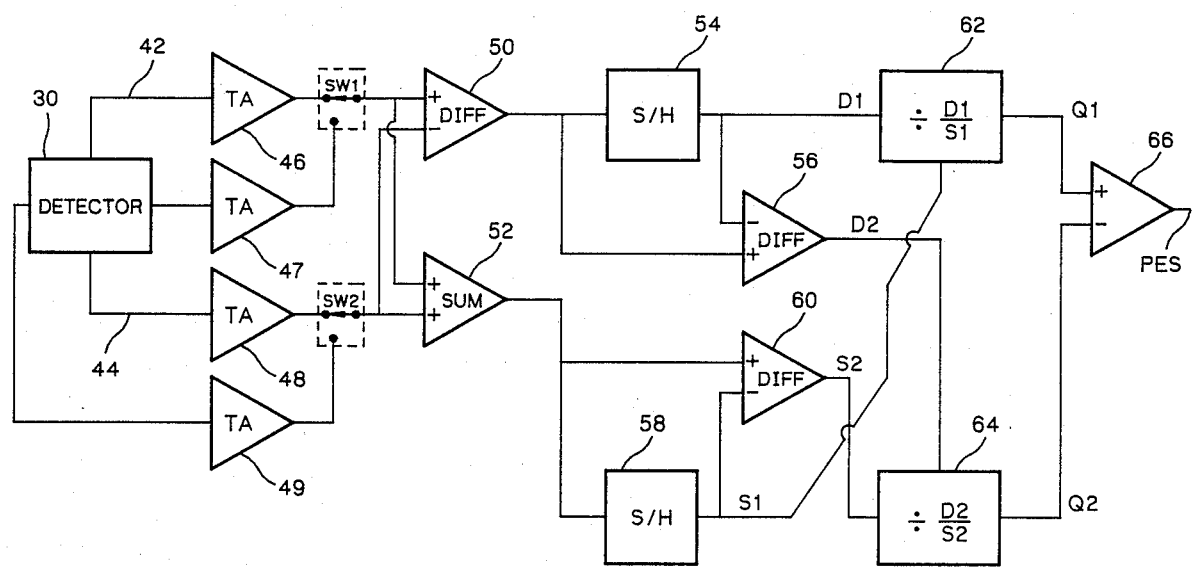
FIG. 3 is a block diagram of the signal processing circuitry of FIG. 1.

Before referring to FIG. 3, however, reference is made again to FIG. 2 for the purpose of explaining how a preferred embodiment of the detector 30 functions. There are many types of detectors known in the art that could perform the measurement function illustrated in FIG. 2. Where the relative dimensions involved are not small, the face of the detector 30 could be made from an array of discrete detectors such that an accurate signal representative of beam position could be generated substantially independent of beam intensity. However, the beam alignment system of the present invention is adapted for use with beams that are extremely small, on the order of 100 microns in diameter. For beams that small, an array of discrete photosensors mounted to a surface of the detector 30 is generally not practical.

In a preferred embodiment of the present invention, the detector 30 is realized using a dual axis position sensor, or a lateral effect photodiode, that provides X and Y axis position information of a light spot on the detector surface. The device senses the "centroid" of all the radiation energy falling thereon, and provides a continuous analog output as this centroid spot moves from a null point to the limit of the active area. A suitable detector for this purpose is manufactured by United Detector Technology, of Culver City, Calif.; and is marketed under the model number of PIN-SC/4D. The output signal generated by this particular model of the detector is a pair of currents, the difference between which has an amplitude proportional to the position of the centroid of the radiation falling upon the detector surface. Unfortunately, each current signal also has an amplitude that is affected by the intensity of the radiation hitting the detection surface. (For purposes of this application, the term "centroid" refers to the "center of mass" of the radiant energy that strikes the surface of the detector. Also, it should be noted, that although the preferred embodiment of the detector is a dual axis detector, capable of sensing position information in both the X and Y direction, for purposes of the basic invention illustrated in FIG. 1, only a single axis need be detected. Accordingly, a split detector could be used for the detector 30 that merely senses when a particular spot is centrally aligned with a given axis.)

Now referring to FIG. 3, there is shown a block diagram of the signal processing circuitry 32 of FIG. 1. Four output signals are generated by the detector, each of which appears on respective signal lines 42, 43, 44, and 45. These signals, as indicated above in the description of the preferred embodiment, are current signals. Each current signal is directed to respective transimpedence amplifiers 46, 47, 48, and 49 whereat the current signal is converted to a voltage signal. The signals on signal lines 42 and 44 relate to the position and intensity of the beam(s) falling on the detector 30 as measured relative to one axis thereof (e.g., the Y axis), while the signals on signal lines 43 and 45 relate to the position and intensity of the beam(s) as measured relative to another axis thereof (e.g., the X axis). The output of two selected transimpedence amplifiers, 46 and 48, or 47 and 49, is connected via switches SW1 and SW2 to a difference amplifier 50 and a summing amplifier 52. The output of the difference amplifier 50 is directed to a sample and hold circuit 54 and to a second difference amplifier 56. The other input to the difference amplifier 56 is the output from the sample and hold circuit 54, which output is designated in FIG. 3 as D1. Similarly the output of the difference amplifier 56 is designated as the D2. The output of the summing amplifier 52 is similarly directed to a second sample and hold circuit 58, which sample and hold circuit has an output designated as S1. The output of the summing amplifier 52 is also directed to the input of a third difference amplifier 60. The other input to the difference amplifier 60 is the signal S1 from the sample and hold circuit 58. The output of the difference amplifier 60 is a signal designated as S2. A first dividing circuit 62 divides the signal D1 by the signal S1 to produce a signal designated as Q1. A second divider circuit 64 divides the signal D2 by the signal S2 to produce a signal Q2. The difference between the signals Q1 and Q2 is determined in a difference amplifier 66, the output of which is the position error signal (PES) that is used to control the galvonometer controlled mirror 18 (FIG. 1).

In operation, the signal processing circuitry of FIG. 3 functions as follows. Switches SW1 and SW2 are selectively configured to connect transimpedance amplifiers 46 and 48 or 47 and 49 into the circuit, depending upon which axis measurement is desired. The output signals from the detector 30, as indicated above, are current signals having an amplitude that includes both position and intensity information. These signals are converted to respective voltage signals by the transimpedance amplifiers 46 and 48, or 47 and 49. Because two beams are falling upon the detector surface 30 during normal operation of the beam alignment system, and because the signals appearing on signal lines 42 and 44 (or 43 and 45) would contain position information relative to a single centroid associated with both of these beams, it is necessary to process these signals to determine the position of the centroid of each beam so that the distance between the centroids of these two beams can be determined. The way that this is done is to turn the first beam 16 off so that only the beam 24' is falling upon the surface of the detector. This information is then stored for later reference in the sample and hold circuits 54 and 58. Then the beam 16 is turned on and both the beams 16' and 24' are allowed to fall upon the surface of the detector 30. The combined spot centroid, i.e., the signal generated while both spots are falling upon the detector, has the previously stored single spot information subtracted therefrom using the difference amplifiers 56 and 60 in order to generate a signal that represents the position of the second spot. The signal processing circuitry further normalizes the signals so that the intensity information embodied within the signals is removed. This normalization occurs in the dividing circuits 62 and 64. Hence, a PES signal is provided that is truly independent of beam intensity and is only a function of beam position.

To illustrate this process in more detail, consider the outputs of the difference amplifier 50 and the sum amplifier 52. When only the beam 24 is on, these outputs contain sum and difference information relative to the position and intensity of the spot 36 (FIG. 2) on the surface of the detector 30. This information is held and stored in the sample and hold circuits 54 and 58 to produce the signals D1 (representing the difference information) and S1 (representing the sum information). Once the signals S1 and D1 are available, the beam 16 is turned on, thereby projecting a second spot 38 (FIG. 2) on the surface of the detector 30. With both spots 36 and 38 falling upon the detector surface, the outputs of the difference amplifier 50 and the sum amplifier 52 represent the combined position and intensity information associated with these two beams. In order to sort out only the position and intensity information associated with the spot 38 from this combined information, the signals D1 and S1 are subtracted from the combined spot information in the difference amplifiers 56 and 60 respectively. Hence, the outputs of the difference amplifiers 56 and 60, represented as D2 and S2 respectively, contain the position and intensity information of the second spot 38 on the detector surface 30. The first spot 36 signal information is normalized in the dividing circuit 62 in order to remove intensity variations therefrom. Similarly, the second spot 38 signal information is normalized in the dividing circuit 64 in order to remove beam intensity information therefrom. Thus, the signal Q1 represents position information associated with the spot 36, while the signal Q2 represents position information of the spot 38 on the surface of the detector 30. The difference between these two signals is determined in the difference circuit 66 in order to produce the desired PES signal. The PES signal that is derived using the above-described process, defines the position error between the two spots as measured primarily along one axis (e.g., the Y axis) of the detector. Most of the variations that occur between these two spots will typically occur along this primary axis if the optical components have been properly aligned. However, during the initial optical alignment of these components, as well as during subsequent diagnostic/error detection routines, it is desirable to derive an equivalent PES signal that defines the position error between the two spots as measured along the other axis (e.g., the X axis) of the detector. The additional transimpedance amplifiers 47 and 49, which are tied to signal lines 43 and 45 of the detector, may be switchably coupled to the difference and sum amplifiers 50 and 52, respectively, for this purpose. This capability—of generating a PES signal representative of position error along two different axes of the detector—advantageously provides: (1) ability to initially set the two spots (beams) at a desired alignment as measured along both axes of the detector; (2) the ability to verify that the spots or beams have the desired relationship therebetween (i.e., to verify that the write spot leads the read spot); and (3) the ability to periodically check the location of the spots on the detector surface to make sure they are confined to a desired region. (If the beams get too far off of a center region of the detector surface, the signals generated by the detector tend to become non-linear, resulting in some degradation of the accuracy of the alignment system.)

Figure 4:
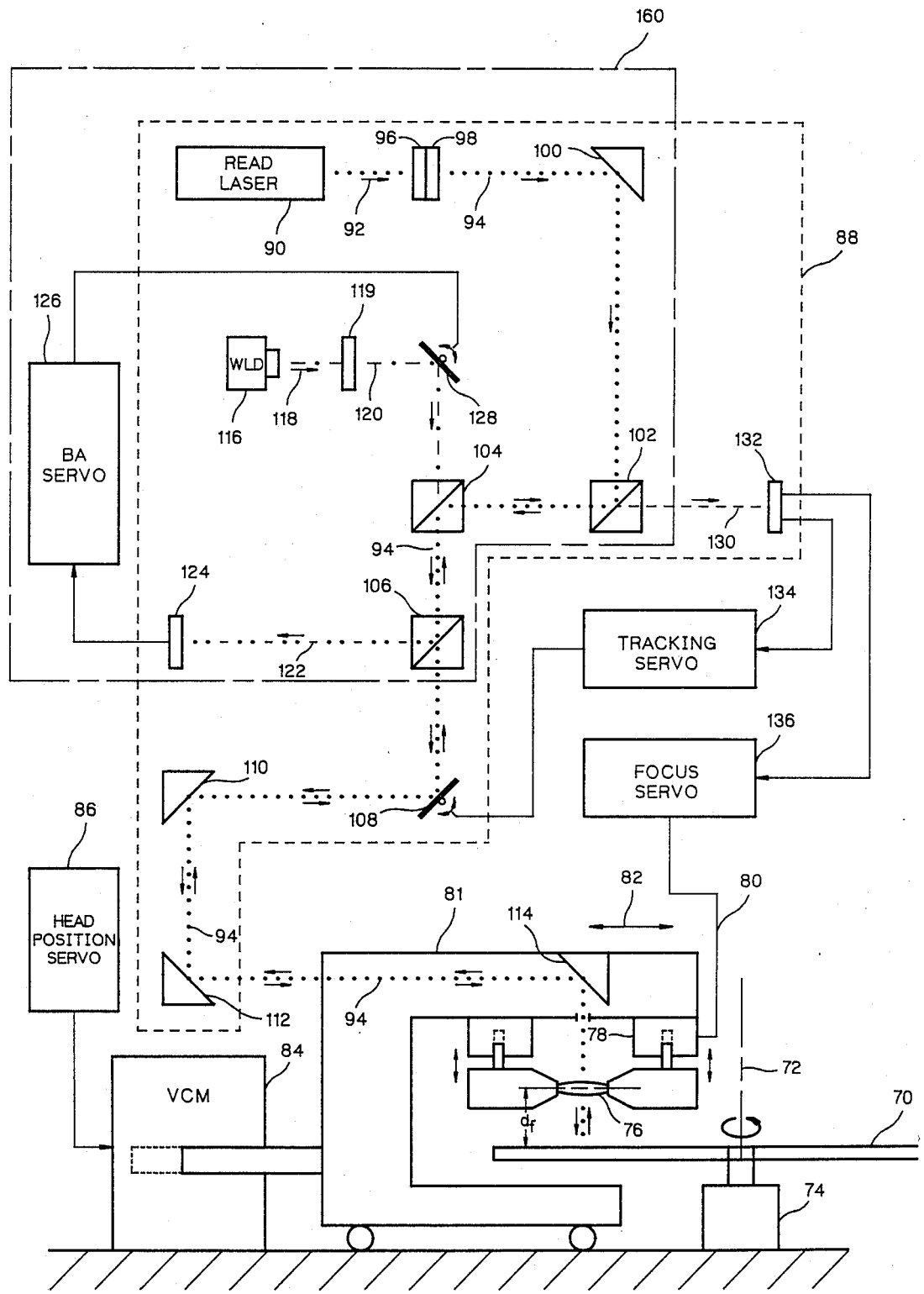
FIG. 4 is a block diagram showing how the present invention is used within an optical disk storage system in order to align a write beam with a read beam.

Referring next to FIG. 4, a block diagram of the beam alignment system of the present invention, comprising the elements enclosed within the dashed line 160, is shown in connection with the block diagram of an optical disk storage system. The invention is used in such a storage system to provide a desired alignment between a read beam and a write beam. The optical disk storage system includes a optical disk 70 that is rotated about a rotational access 72 by a motor 74. The disk 70 includes radiation sensitive layers placed thereon that can be marked by a beam of radiant energy. An objective lens 76 is disposed adjacent to the surface of the disk 70. The distance $d_f$ from of the lens 76 to the surface of the disk 70 is controllable by focusing means 78, which focusing means respond to a focus control signal appearing on signal line 80. The focus means 78 may be realized with any suitable means for achieving the desired motion, such as a voice coil motor (VCM), or the like.

The lens 76 and focusing means 68 are mounted to an optical head 81 that is slidably mounted for radial movement in the direction of the arrow 82 with respect to the disk 70. This movement is typically realized by means of a VCM 84 that positions the optical head 81 in response to a suitable control signal generated by a head position servo system 86. The details of the head position servo 86 are not important to the present invention, but a suitable positioning servo is described in co-pending U.S. Pat. applications Ser. No. 438,133, filed Nov. 1, 1982, now abandoned, and 503,955, filed June 13, 1983, now abandoned, both of which are assigned to the same Assignee as is the present application.

The optical components used to generate the beams that are directed to the surface of the disk 70 are mounted on a stationary optical plate 88. These components include a read laser source 90 that generates a read beam 92. The beam 92 follows an optical path 94 indicated in FIG. 4 as a dotted line. As will be explained more fully below, the read beam 92 is diffracted into a plurality of beams by optical gratings 96 and 98. All of these beams have a fixed angle therebetween as determined by the gratings 96 and 98, and they all follow the dotted line path 94. This path 94 directs the beams off of a mirrored surface 100, to a beam separator 102, to a beam combiner 104, through a beam splitter 106, off of a galvonometer controlled mirror 108, off of fixed mirrored surfaces 110 and 112, and into the optical head 80 where the path further includes at least one additional mirrored surface 114 which directs the beams following the path through the objective lens 76 onto a desired point of the surface of the rotating disk 70.

A write laser source 116 generates a write laser beam 118 that follows an optical path 120 indicated by the dashed single-dot line in FIG. 4. This write path 120 joins the primary beam path 94 (dotted line) at the beam combiner 104. Hence, from the point of the beam combiner 104 to the surface of the disk 70, the path 94 is shared by both the read beams and the write beams. (The small arrows on either side of the optical path 94 indicate the direction that the various beams are traveling at that point along the path 94.)

The beam splitter 106 splits off a portion of the beams traveling through the path 94 and directs them along an optical path 122 represented in FIG. 4 by a dashed double-dot line. This path terminates at a beam alignment detector 124. The detector 124 is positioned so that only beams split off from the write beam 118 and a desired read beam are mapped onto the surface of the detector 124. The position of the spots appearing on the detector 124 are measured and processed in a beam alignment servo 126. The beam alignment servo 126 provides a control signal to a galvonometer controlled mirror 128 which steers the write beam 118 as it is fed into the optical path 94 at the beam combiner 104. The detector 124 may be of a type previously described in connection with FIGS. 1–3, and the beam alignment servo 126 essentially comprises the signal processing circuitry 32 and galvo-driver 34 described in connection with FIGS. 1 and 3.

The read beams that strike a surface of the disk 70 are reflected back along the optical path 94 all the way back to the beam separator 102. At this point, the reflected beams are directed along a path 130, represented in FIG. 4 as a dashed line. This path 130 directs these beams to a second optical detector 132. This detector 132 serves many functions, including: (1) it detects the position of a first group of read beams that fall upon a surface thereof and this information is fed to a tracking servo 134, which tracking servo provides the control signal for steering the galvonometer controlled mirror 108; and (2) it detects whether or not the beams that are falling upon the surface of the disk 70 are in focus, and feeds this information to focus servo circuitry 136, which focus servo 136 generates an appropriate control signal directed to the focusing means 78 over signal line 80 in order to place and maintain the lens 76 at a desired in-focus position. As can be seen from FIG. 4, the galvo mirror 108 jointly steers all of the beams that are traveling along the optical path 94 to and from the surface of the disk 70. Hence, the tracking servo 134 jointly steers all of the beams so that they strike the surface of the disk 70 at a desired location. The focus servo 136 ensures that all these beams are properly focused when they strike the surface of the disk 70.

In order to better understand the operation of the optical disk storage system illustrated in FIG. 4, and to better appreciate how the beam alignment system of the present invention is used therewithin, reference is now made to FIGS. 5A, 5B and 6 in order to illustrate how a preferred embodiment of the optical disk 70 is formatted. In FIG. 4A, a portion of the disk 70 is illustrated. This disk is divided into a large number of concentric data bands comprising a plurality of data tracks into which data may be stored. Concentric coarse servo tracks separate one data band from another. Two such coarse servo tracks 140 and 142 are illustrated in the enlarged portion of FIG. 5B. A first data track 146, adjacent to the coarse servo track 140, is previously written on the disk during the manufacture thereof and is used to identify the data band 144. This first data track in the data band is referred to as the "home address track". As illustrated in FIG. 5B, the data band 144 contains a large number of data tracks. In the preferred embodiment, up to 49 tracks, including the home address track 146, are included in a data band.

Referring to FIG. 6, an expanded view of a portion of the disk surface 70 encircled by the dashed line 6—6 is shown. This expanded view includes a portion of a coarse servo track 142, a home address track 148, two data tracks 150 and 152, and a partially written data track 154. In FIG. 6, it is assumed that the disk is rotating in the direction indicated by the arrow 156.

Included in FIG. 6 are a pattern of seven spots, representing the various beams that are directed to the surface of the disk along the optical path 94 (FIG. 4). The write beam 118 is directed to the write point on the disk so as to create the write track 154 as the disk rotates in the direction indicated by the arrow 156. The read beam 92 is split into 6 beams by the defraction gratings 96 and 98 (FIG. 4), and these beams are arranged in a pattern as illustrated in FIG. 6. A first read beam 93 is centered on the previously written data track 152. Track following beams 95 and 97 are positioned in front and behind the read beams 93 and offset so as to provide a dual beam tracking function as is known in the art. Basically, in accordance with the teachings of the art, the detector 132 (FIG. 4) is able to detect when the beams 95 and 97 are half on and half off the track 152 which they are following. If they are not exactly half on and half off of the track, an error signal is generated by the track servo 134 to steer the beams in an appropriate direction to make them follow the track 152. The read beam 93 is positioned midway between the following beams 95 and 97, thereby causing the read beam 93 to precisely follow the track 152. An additional read beam 99 is positioned relative to the beams 93, 95, and 97, so as to fall behind the write beam a short distance. This read beam 99 is used to read the data written in the track 154 immediately after it has been written therein by the write beam so that if an error is detected the incorrect data may be flagged or marked and the data may be correctly written over again.

Two additional read beam spots 101, 103 are positioned relative to the read beam 99 in a configuration that is similar to the positioning of the tracking beams 95 and 97 with respect to the read beam 93. These "auxiliary" read tracking beams 101, 103 serve no purpose when a track is being written by a write beam as shown in FIG. 6. Hence, the beams are shown only as dashed circles. However, these beams do serve a valuable purpose during a calibration mode of the optical disk storage system, as explained below.

The optical disk 70 used in the optical storage system shown in FIG. 4 is preferably a removable disk that may be used in any compatible optical disk storage system. Because the various optical storage systems cannot be identically alike, there will be variations from system to system with respect to the alignment of the read beams created by the optical gratings 96 and 98. Moreover, some of the components used within the stationary optics plate 88 will drift somewhat over time and with variations in temperature. Therefore, a constant fixed stable pattern between the beams 93, 95, 97, 99, 101, and 103 cannot be guaranteed from system to system and over time. To account for these slight variations that will occur, and in order to guarantee a fixed track pitch distance, d (see FIG. 6), a track pitch calibration procedure is employed. One band on the disk 70 has previously written thereon, during the manufacture of the disk, a plurality of data tracks that are precisely spaced at the desired track pitch. This precise spacing is achieved using precision servo writing equipment, known to and operable by those skilled in the art, suitable for use in a dark manufacturing facility, but no feasible for use in an optical disk storage system. After a disk has been inserted into an optical disk storage system, a calibration mode may be initiated during which the optical head 80 is positioned so that the previously written data tracks are positioned under the six read beams 93, 95, 97, 99, 101, and 103. During this calibration mode, the write beam is turned off. If the read beam pattern is perfectly aligned with these two read beam tracks, then the detector 132 and associated tracking servo circuitry 134 (FIG. 4) indicate this aligned position by generating an "on track" signal. (This on track signal is typically a null signal, although any signal scheme could be used to indicate an on track condition). More often than not, however, the tracking servo 134 will indicate during this calibration mode that an error condition exists; that is, one of the precision written tracks is not aligned with the other precision written track as measured by the particular spot configuration of the optical drive storage system being used. The magnitude of this error condition, referred to as an "offset", is converted to an offset measurement that is saved. In effect, the "offset" represents a correction factor that must be used with the particular read beam configuration in order to position data tracks at the same track pitch as exists with the precision written tracks previously placed on the disk.

In operation, when it is desired to write a new data track on the disk, the beam alignment system of the present invention positions the write beam a desired distance (the track pitch) from the read beam as previously discussed. However, the position error signal (PES) generated by the beam alignment servo is modified or corrected by the amount of the "offset" that is measured during the track pitch calibration mode described in the previous paragraph. In this fashion, the track pitch is precisely maintained at the desired distance regardless of any variations that may exist in the optical components associated with the particular optical storage system that is used, or that occur over the life of the components being used. As previously indicated, maintaining a precise track pitch is extremely important in a high density storage system so that disk interchangeability and compatibility exists from system to system and so that an optimum amount of data may be stored.

Figure 7:
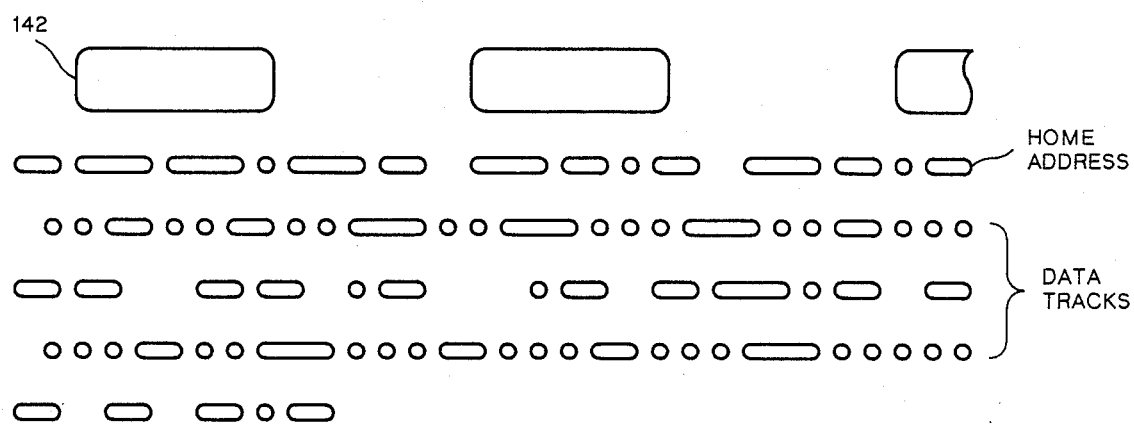
FIG. 7 illustrates how data patterns are embedded or marked within the data tracks and coarse servo tracks in accordance with a preferred embodiment of an optical disk used with the optical disk storage system of FIG. 4.

In the preferred embodiment, the actual type of data patterns that are placed in the coarse servo tracks and data tracks are illustrated as shown in FIG. 7. A coarse servo track 142 includes a pattern of marks that include a reflectivity-high segment followed by a reflectivity-low segment. As described in the aforecited patent applications, these coarse servo tracks 142 are illuminated with a separate light source included within the head position servo 86 and are used to position the read head 80 at a desired radial position with respect to the disk. The data tracks themselves have the data stored therein through a similar reflectivity-high/reflectivity-low pattern. Typically, an appropriate encoding scheme, such as a 2, 7 code, is employed to encode the data prior to writing it on the disk. Such a code, marks data transitions (transitions from binary 1's to binary 0's and visa versa) rather than marking the disk if a binary "1" is present, and not marking it if a binary "0" is present, or vice versa. Hence, in FIG. 7, the actual transition from a reflectivity-high to a reflectivity-low point along a given data track would correspond to a similar transition from a binary 0 to a binary 1 (or visa versa) in the data pattern.

It is to be understood that the diagram of the optical disk storage system shown in FIG. 4 is a simplified version of the entire system that is used. Nonetheless, it best illustrates how the beam alignment system of the present invention, comprising the elements encircled by the dashed line 160, is utilized within such a system.

Figure 8:
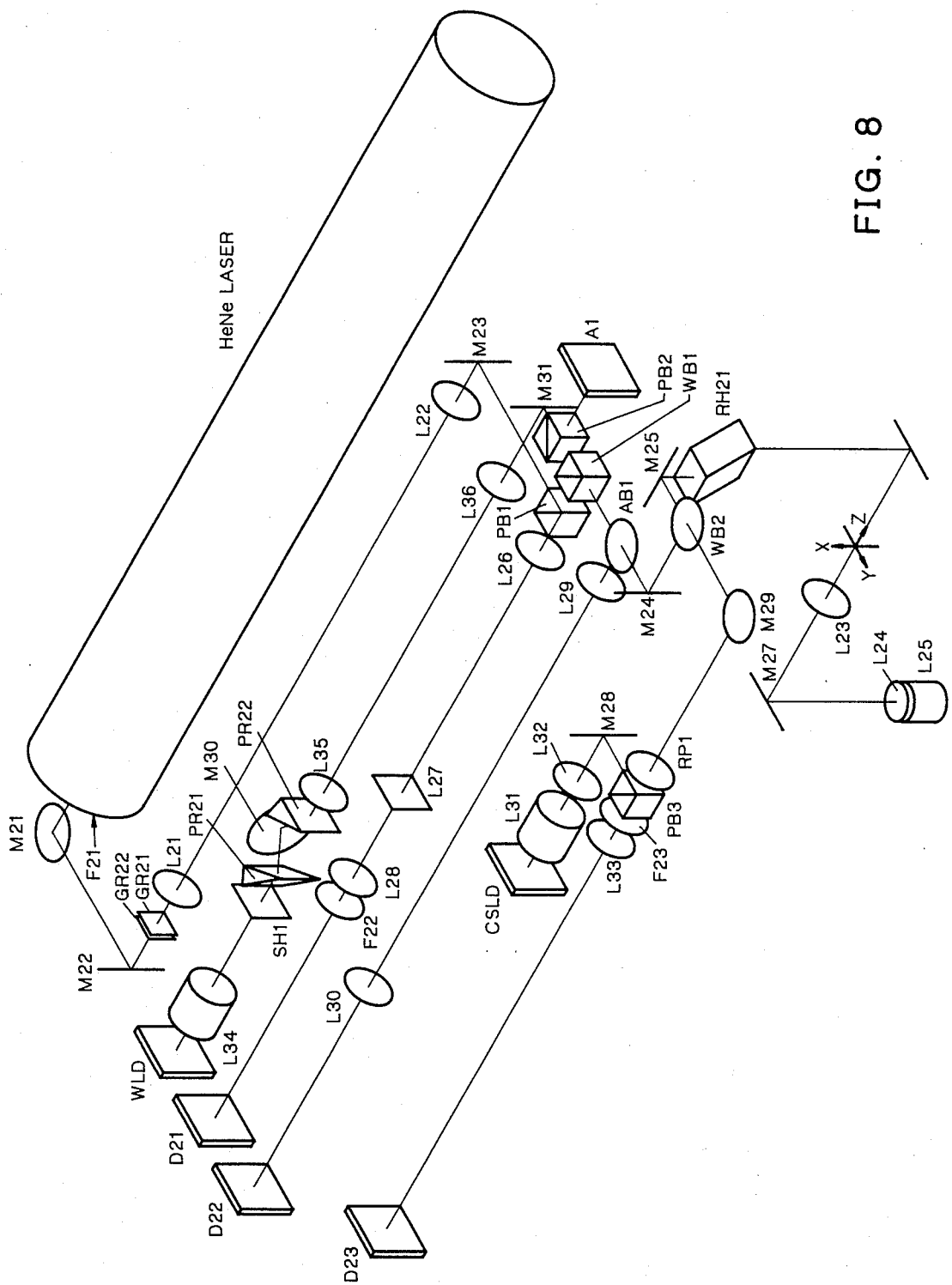
FIGS. 8, 9, 10 and 11 are figures relating to Appendix A, attached hereto, which Appendix describes the optical components used in connection with the preferred embodiment of the optical disk storage system of FIG. 4, more particularly.

A more detailed diagram of the optical components used with the preferred embodiment of the present invention is illustrated in the perspective optical diagram shown in FIG. 8. These optical components, and the function they perform are more fully described in Appendix A, attached hereto and incorporated herein by reference. FIGS. 8, 9, 10, and 11, are explained in connection with Appendix A.

While the invention herein disclosed has been described by means of specific embodiments and applications thereof, numerous modifications and variations could be made thereto by those skilled in the art without departing from the spirit and scope of the present invention. Accordingly, it is to be understood that within the scope of the appended claims, the invention may be practiced otherwise than as specifically described herein.

APPENDIX A

LASER/OPTICAL COMPONENTS

The Laser/Optical Components associated with the Optical Drive Storage System for use with the beam alignment system of the present invention are physically provided in two separate assemblies. The Fixed Optics assemblies are mounted to the frame and may contain the following units as referenced in FIG. 8:

1. Write Laser Diode Module (WLD, L34, L35, L36, SH1, PR211, PR212, and M30)
2. HeNe Read Laser
3. Write Alignment Actuator (GA2)
4. Radial Tracking Actuator (GA1)
5. Complex Grating (GR21 and GR22)
6. Read Collimating Telescope (121 and L22)
7. Write Alignment Detector (D22)
8. Astigmatic Optics (L26, L27 and L28)
9. Read/Focus/Track Detector (D21)
10. Read/Write Beam Combiner (WB1)
11. Read/Write/Coarse Seek Beam Combiner (WB2)
12. Read Beamsplitter (PB1)
13. Write Beamsplitter (PB2)
14. Amplitude Beamsplitter (AB1)
15. Coarse Seek Laser Diode (CSLD)
16. Coarse Seek Beamsplitter (PB3)
17. Coarse Seek Detector (D23)
18. Fresnel Rhomb Prism
19. Associated mirrors, lenses, prisms, absorber, filters, shutter, and retarder plate The Moving Carriage Optics, mounted on the Moving Carriage, provide the other assembly. Included in this assembly are:

1. Imaging/Beam Shaping Telescope (L23 and L24)
2. Objective Lens and Focus Actuator (L25)
3. Beam-Folding Mirror (M27)

1.0 Optical Components

The following paragraphs describe the optical components in detail and their functions with relation to both reading and writing on the disk platter. Reference designations are with reference to FIG. 8.

1.1 Read Laser

The HeNe laser provides the raw 633 nm wavelength beam required for read operations. This gas laser source has a nominal output of 5 mW and produces a nominally collimated beam of light having a diameter of 0.83 mm. The raw beam is transmitted by Filter 21 and reflected by two mirrors (M21 and M22) onto a transmissive grating (Complex Grating). It then passes through a system of lenses, beamsplitters, and related optics before it is incident upon the disk.

F21 functions as a natural density filter and absorbs or reflects some of the 633 nm light and transmits the rest through the system. It is 15 mm in diameter and 3 mm thick. M21 and M22 are each 20 mm in diameter and 5 mm thick and have a 10-5 surface finish on the narrow central working aperture.

1.2 Complex Grating

The Complex Grating Subassembly (GR21 and GR22) is a transmissive grating system which diffracts the raw HeNe laser beam into six separate beams of light. It actually consists of two gratings placed back-to-back which separate the incoming laser beam into an array of beams.

The initial beam is incident perpendicular to the grating substrate. Of the six exiting beams one is parallel to the optical axis; the other five beams come out at angles corresponding to the spacing of the rulings on the gratings. The first grating is a transmissive grating which diffracts power from the zero (undiffracted) order into the $\pm 1$ orders, thus providing three beams. The second grating is a blazed transmissive grating which diffracts power into the $\pm 1$ order; thus, it splits each of the three spots into a pair of spots. The net effect of the Complex Grating is, therefore, to form an array of six beams from the raw HeNe laser beam.

When these six beams are focused at the disk to form six spots, four are used to derive tracking error signals, two are used for reading, and one of the read spots is simultaneously used to derive a focus error signal. They are referred to as: Read Previous Track, Readback Check, and Tracking No. 1, No. 2, No. 3, and No. 4.

1.3 Read Collimating Telescope

The Read Collimating Telescope consists of two infinite conjugate doublets, L21 and L22. L21 has a focal length of 24 mm; L22 has a focal length of 252 mm. The telescope serves two purposes: to expand the six beams of light and to image the recollimated beams onto the Radial Tracking Actuator mirror (GA1 and M24). It works in conjunction with the Imaging/Beam Shaping Telescope to provide the necessary beam diameter and imaging at the objective.

After transmission through the collimating telescope which expands all six beams to a diameter appropriate for the carriage optics, the beams are incident upon folding mirror M23. The mirror, which is 24 mm in diameter and 5 mm thick, reflects the beams through the system to the Radial Tracking Actuator mirror M24 which is positioned at an image plane of the grating.

1.4 Read Beamsplitter

The Read Beamsplitter (PB1) may be a polarization sensitive cube beamsplitter with a dimension of 15 mm on each side. It is coated on the diagonal and directs the read beam depending upon its path, to or from the disk. Headed towards the disk the read beam is S polarized whereas the return beam is P polarized. The incoming beam reflects off the beamsplitter and passes onto the Read/Write Beam Combiner. The reflected beam is transmitted through the Read Beamsplitter to the Read/Focus/Track Detector train. Alternatively, this same function may be realized with a spatial beamsplitter wherein beams are either reflected in a desired direction by a reflective surface that is precisely positioned therein or not so reflected depending upon the spacing or distance between the beams. A spatial beamsplitter does not require that the beams be polarized.

1.5 Read/Write Beam Combiner

The Read/Write Beam Combiner WB1 is a wavelength beam combiner. It is a cube with a dimension of 15 mm on each side. The combiner is coated with a on the diagonal to transmit the 835 nm wavelength of the infrared Write Laser Diode and reflect the 633 nm wavelength of the read HeNe laser. This special coating on the combiner allows the read and write beams to be combined efficiently on their way to the disk.

The read beam is reflected by the Read Polarization Beamsplitter onto the Read/Write Combiner. The write beam is transmitted by the Write Polarization Beamsplitter onto the Read/Write Conbiner. The combined beams are then incident upon the Amplitude Beamsplitter.

The Read/Write Combiner acts as a beamsplitter with respect to the returning read and write beams. The returning write beam passes through the combiner and is sent back to the Write Polarization Beamsplitter. The returning read beam is again reflected off the combiner and transmitted by the Read Polarization Beamsplitter to the Read/Focus/Track Detector.

1.6 Amplitude Beamsplitter

The Amplitude Beamsplitter (AB1) is a cube beamsplitter with a dimension of 15 mm on each side. It has a dielectric coating which causes most of the 633 nm read light and 835 nm write light to be transmitted through the diagonal. A small friction of both the read and write light is reflected by the beamsplitter.

Coming from the Read/Write Combiner the incoming combined beams reach the Amplitude Beamsplitter. The beamsplitter reflects a small portion of the read and write beams down to the Write Alignment Detector which measures their relative alignment. The larger portion of each beam is transmitted by the beamsplitter and goes onto the Carriage Optics.

Most of the light from both the returning read and write beams is transmitted back through the Amplitude Beamsplitter. A minute portion of light from both beams is reflected off the beamsplitter and is not used.

1.7 Radical Tracking Actuator

The Radial Tracking Actuator (GA1) is a galvanometer with Mirror M24 mounted on it. It works in conjunction with the Read/Focus/Track Detector to maintain radial alignment of the read beam with respect to tracks on the disk.

As previously described the Read Collimating Telescope images to Complex Grating onto the galvanometer mirror which is a rectangle 13 mm by 17 mm. The mirror is positioned on the galvo so that the face of the mirror pivots about the center of the 17 mm dimension. The effect of the collimating telescopic action is to reduce the mirror weight and size. It, therefrom, minimized the galvanometer moving mass. The reduction in mass produces a fast response time in terms of maintaining alignment and increases the capability of writing at an extremely high data rate.

The galvanometer mirror is imaged by the Imaging-/Beam Shaping Telescope so that the image is placed at the entrance pupil of the Objective lens. If the grating and galvanometer are correctly imaged, the aperture is properly filled, allowing the maximum amount of light to pass through the Objective Lens (L25) and focus on the disk.

1.8 Read/Write/Coarse Seek Combiner

The Read/Write/Coarse Seek Combiner (WB2) is a wavelength beam combiner. It plays a significant role in the optical system. It combines the HeNe beam, Write beam and Coarse seek beam and sends the combined beam to the Carriage Optics. In actuality, it is a plate beamsplitter 20 mm in diameter, 5 mm thick, and is coated to manage both the parallel and perpendicular polarizations of the three beams directed towards the disk and the flipped polarizations of the returning beams.

The front surface of the combiner reflects the 835 nm write light and the 633 nm read light while the antireflection coating on the rear transmits the 780 nm coarse seek beam. The read and write beams reflected by the Radial Tracking Actuator are also reflected by the combiner while the coarse seek beam is transmitted. Thus, the three beams are combined and transmitted by the rhomb prism and to reach the Carriage Optics.

With respect to the returning beams the combiner acts like a beamsplitter. The three reflected beams reach the combiner. The read and write beams reflect off of it and are sent to the Radial Tracking Actuator. The coarse seek beam is transmitted and sent down to the Coarse Seek Detector.

1.9 Rhomb Prism

The Fresnel Rhomb Prism (RH21), rhomboidal in shape, functions as an achromatic quarter wave plate. It is a parallelogram in cross section, the angle of the parallelogram being approximately 55°. The front face of the prism is a square aperture, 20 mm on a side.

The prism works in conjunction with the polarization sensitive beamsplitters to direct the paths of the beams. Each of the three laser beams enters the prism perpendicular to its front face. Once in the prism the linear polarization of each beam is changed to a circular polarization. When the beams reflect back from the disk the circular polarization is rotated. The rotated circularly polarized wavefronts are changed into linearly polarized wavefronts when transmitted through the rhomb but with linear polarizations at an angle 90° to what they were previously.

Mirror M25 reflects the beams into and out of the prism. It is 24 mm in diameter and 5 mm thick. Mirror M26 receives the beams from M25 and makes them collinear with the optical axis of the carriage optics. It is 30 mm in diameter and 5 mm thick.

1.10 Imaging/Beam Shaping Telescope

The Imaging/Beam Shaping Telescope consists of two infinite conjugate lenses, L23 and L24. L23 is an achromatic doublet with a focal length of 86.4 mm. L24 is also achromatic and has a focal length of 39.3 mm. MIrror M27 is a Beam-Folding Mirror which passes the beam from L23 to L24. It is 12 mm in diameter, 3 mm thick and reflects the 633, 780, and 835 nm wavelengths equally. Additionally, it reflects the S and P polarizations equally.

The primary purpose of the telescope is change the beam diameters to match the entrance pupil of the Objective Lens. If the diameters are correct the aperture of the Objective Lens is properly filled and the maximum amount of light can pass through the lens to focus on the disk. The beam coming out of L24 and reaching the Objective Lens has been demagnified 2.2 to 1 since leaving the galvanometer mirror. The second function of the telescope is to image the Radial Tracking Actuator mirror into the pupil of the objective lens.

1.11 Objective Lens

L25 is the objective lens which focuses the read, write and coarse seek beams on the disk. It is a circular lens with a 0.60 numeral aperture and an entrance pupil diameter of 4.22 mm. The collimated light coming into the lens is focused at the disk. The lens is mounted into the focus actuator which is responsible for the correct spatial distance between the objective and the disk.

The focus actuator maintains focus within an accuracy of ±0.12 microns. Essentially, it is a wire wrapped tube surrounded by magnets. Current passing through the coil creates an electromagnetic field determining the distance and direction of the tube movement. Tube movement shifts the lens with respect to the disk when signals are received from the Track Detector electronics. A spring mechanism, prevents extreme movements either towards or away from the disk.

1.12 Astigmatic Optics

The Astigmatic Optics consists of three lenses: L26, L27, and L28. They are located on the Read/Focus/Track Detector train between the Read Polarizing Beamsplitters and the Read/Focus/Track Detector. L26 is an achromatic doublet with a positive focal length of 240 mm. L27 is a spherical lens with negative focal length of −125 mm. L28 is a cylindrical lens with a positive focal length of 250 mm. L26 and L27 work together to form a front spherical lens for a standard astigmatic optics system. L28 receives the circular beam from L27 and introduced an astigmatism so that the spatial pattern of the beam is sensitive to small amounts of defocus of the objective lens with respect to the disk.

All six read beams pass through the astigmatic optics to reach the Read/Focus/Track Detector. To illustrate how the Astigmatic Optics are used note that the Read Previous Track spot reflects from the disk and passes through the Astigmatic Optics to reach the Read/Focus/Track Detector. Because L28 is cylindrical it produces two focal planes, each oriented on a different axis. If the spot at the disk is in focus it passes through L26, L27, and L28 and produces a circularly symmetric blur circle between the two axes at the Read/Focus/Track Detector plane. If the spot is out of focus at the disk it passes through the Astigmatic Optics and produces an ellipse in either a positive or negative direction, causing a focus error signal to be generated. Refer to FIG. 4–16.

1.13 Read/Focus/Track Detector

The Read/Focus/Track Detector (D21) is an array of detectors which receives read signals reflected from the disk and converts the reflected signals into read data, focus error information, and fine tracking information. It provides a signal for the Radial Tracking Actuator to keep the Read beam radially aligned with the disk. A reflected read beam from the disk passes through the Astigmatic Optics and Filter F22 and reaches the Read/Focus/Track Detector. If the read beam is improperly positioned on a fine track or is off track the detector receives the information and converts it into an electronic signal. The signal causes the Radial Tracking Actuator mirror to pivot to realign the beam.

D21 consists of a single chip with nine separate photosensitive elements. Five of the elements are circular with a diameter of $1.20 +/- 0.05$ mm. The additional four elements form a quad array, each element being square and 0.44 mm on a side. The diameter of each light spot on the array elements is 0.8 mm.

F22 is located on the Read/Focus/Track Detector train in close proximity to the detector. It transmits greater than 98% of any infrared light. F22 prevents any stray 835 nm wavelength light from returning through the system to the Read/Focus/Track Detector. The filter is 15 mm in diameter and 3 mm thick.

1.14 Write Laser Diode Module

The Write Laser Diode Module is a Field Replaceable Unit which consists of the Write Laser Diode (WLD), Collimator Lens L34, Shutter SH1, the Prism Beam Expander (PR211, M30 and PR212) and a Collimating Telescope (L35 and L36). The module components produce a circularly symmetric beam for recording on the disk. The following paragraphs detail each of the components.

1.14.1 Write Laser Diode

The Write Laser Diode (WLD) is a 20 mW infrared light source with a wavelength of 835 nm. It is the beam which makes marks or pits on the disk platter surface. The elliptical beam is emitted from the rectangular laser facet, is collimated, and made circularly symmetric as it goes through the module prisms and lenses.

1.14.2 Write Beam Collimator Lens

The Write Beam Collimator Lens (L34) is a spherical lens which collects and collimates the light from the laser diode facet. It has the same specifications as Objective lens L25 with a 0.60 numeral aperture and an entrance pupil of 4.22 mm.

1.14.3 Shutter

The Shutter (SH1) is a mechanical device which slides vertically in front of L34. It takes approximately 5 msecs to open. When open the full power of the write laser beam is transmitted through the system to make marks on the disk. When closed the shutter filter permits a small fraction of light to travel through the system. The light, however, does not write on the disk because the power of the light is greatly diminished by the shutter filter. The shutter must be closed to insure an accurate measurement of the radial alignment between the write and Read Previous Track spots. If the shutter were open during a measurement the full power of the write laser would be incident upon the disk and unwanted marking of the disk would occur.

1.14.4 Prism Beam Expander

The Prism Beam Expander (PR211, M30 and PR212) consists of two reflecting prisms and a mirror M30 which reflects the P polarization of the 835 nm write light with high efficiency. The entering face of PR211 and the exit face of PR212 are both 16 mm by 8 mm.

Both prisms have a thickness of 8 mm. The included angle between the entering and exit faces varies between 40° and 50° depending upon the laser diode.

The subassembly produces a circularly symmetric beam from the elliptical beam entering the front face of PR211. The narrow dimension of the elliptical spot is expanded as it is transmitted through the prisms while the wide dimensions of the beam remains unchanged. Refraction through the prisms produces the circularly symmetric beam leaving the exit face of PR212.

1.14.5 Collimating Telescope

The Collimating Telescope consists of two sperical doublets, L35 and L36. The purpose of the telescope is to expand the collimated circular beam which comes out of the Prism Beam Expander to the diameter appropriate for the Carriage Optics. The expanded beam is then incident upon the Write Alignment Actuator.

L35 and L36 are specially selected to accommodate the varying divergence angles of laser diodes. L35 ranges in focal length from 40 to 50 mm, and L36 from 120 to 148 mm; the effect of these ranges is to allow the Collimating Telescope to vary in magnification from 2.4 to 3.7X.

1.15 Write Alignment Actuator

The Write Alignment Actuator (GA2) is a galvanometer with mirror M31 mounted on it. The actuator provides radial alignment of the write beam to the read beam. It receives electronic signals from the Write Alignment Detector indicating misalignment. If misalignment occurs the galvanometer mirror M31 is tilted to reposition the write beam and correct alignment.

M31 is rectangle 13 mm by 17 mm. It pivots about the center of the 17 mm dimension.

1.16 Write Alignment Detector

The Write Alignment Detector (D22) senses radial misalignment of the write beam with respect to the read beam. It is manufactured by United Detector Technology, Model PN SC-4D, with an active surface of 2.5 mm by 2.5 mm. the detector provides two-dimensional error information for the radial position error between the read and write beams. Both the Readback Check spot and the write spot are imaged upon this detector when the shutter is closed at which time the detector senses the radial distance between the two. Based on that distance the detector sends an error signal to the Write Alignment Actuator to realign the write beam to the read beam.

1.17 Write Alignment Lens Subassembly

The Write alignment Lens Subassembly includes spherical lenses L29 and L30. They are located between the Amplitude Beamsplitter and the Write Alignment Detector. L29 has a positive focal length of 240 mm; L30 has a negative focal length of −49 mm. The lenses are 250 mm from each other and operate as a single telephoto lens with an effective focal length of 1000 mm. They form an image at the Write Alignment Detector of the Write and Readback Check spot. The lenses are designed so that the other five read spots are not incident upon the Write Alignment Detector.

1.18 Write Beamsplitter

The Write Beamsplitter (PB2) may be a polarization sensitive cube beamsplitter with a dimension of 15 mm on a side. It can accommodate wavelengths ranging from 820 to 850 nm. Directed towards the disk the write beam is P polarized, is transmitted through the Write Polarization Beamsplitter and reaches the Read/Write Combiner. After reflection at the disk the return beam again passes through the Rhomb Prism and becomes S polarized. It reflects off the polarization sensitive beamsplitter and onto an Absorber. Alternatively, this beam splitting function may be carried out using a spatial beamsplitter wherein beams are split off in a desired direction as a function of the distance therebetween, as described in paragraph 1.4 above.

1.19 Coarse Seek Laser Diode

The Coarse Seek Laser Diode (CSLD) is a 5 mw infrared light source with a 780 nm wavelength. Unlike the pulse Write Laser Diode it is continuously driven. The beam is emitted from a rectangular laser facet, is collected by L31, and becomes astigmatized as it passes through L32.

The coarse seek beam forms a line focus at the disk and upon reflection, returns to the Coarse Seek Detector, indicating the position of the objective lens relative to the center of a particular coarse track. The Detector converts the image into carriage position error information which is relayed to the Voice Coil Motor to appropriately reposition the carriage.

1.20 Coarse Seek Lenses

The coarse seek lenses consist of L31, L32 and L33. Together L31 and L32 provide an illumination profile at the disk. L31 is an 18X objective which nominally collimates the elliptical beam coming from the Coarse Seek Laser reflected beam and works in conjunction with the carriage telescope to form an image plane of the disk on the Coarse Seek Detector.

1.21 Coarse Seek Beamsplitter

The Coarse Seek Beamsplitter (PB3) may be a polarization sensitive cube beamsplitter with a dimension of 15 mm on a side. Going towards the disk the coarse seek beam is S polarized so it is reflected by the Coarse Seek Polarization Beamsplitter to the Read/Write/Coarse Seek Combiner. After reflection at the disk and a second transmission through the Rhomb, the beam is P polarized so it is transmitted by the beamsplitter and is incident upon the Coarse Seek Detector. Alternatively, a spatial beamsplitter may be used for this function as described above in paragraph 1.4, in which case the coarse seek beam need not be polarized.

1.22 Retarder Plate

The Retarder Plate (RP1) is a quartz retarder plate of multiple order to accommodate the wavelength variations coming from the Coarse Seek Laser diode. It changes the direction of polarization and works in conjunction with the Rhomb Prism to achieve the right degree of polarization for the coarse seek beam to correctly illuminate the disk and form an image plane on the Coarse Seek Detector. The convergent/divergent light in the uncollimated coarse seek beam produces unequal polarization changes when passing through the Rhomb. The Retarder Plate works with the quarter wave plate action of the Rhomb to properly adjust the polarizations.

1.23 Filter F23 and Mirror M29

Filter F23 is located between the Coarse Seek Detector and the Coarse Seek Polarization Beamsplitter. It is 15 mm in diameter and 3 mm thick. It transmits the coarse seek beam with greater than 94% efficiency and blocks 98% of 835 nm light. M29, located between the Retarder Plate and Read/Write/Coarse Seek Combiner reflects the coarse seek beam into and out of the Carriage Optics. Additionally, it transmits all but a fraction of 633 nm light and so prevents the HeNe light from being incident upon the Coarse Seek Detector. The mirror transmits 633 nm wavelengths through its coating and scatters the light off its rear surface. Any stray 633 nm light reflected from the mirror is blocked by F23 and prevented from forming an image on the Coarse Seek Detector.

1.24 Coarse Seek Detector

The Coarse Seek illumination pattern at the disk is imaged at the Coarse Seek Detector which senses carriage radial position error. If the objective lens is on the optical center a null signal is sensed. If the lens is off center a positive or negative signal is sensed. The detector relays this information to the Voice Coil Motor which repositions the carriage. Additionally, the coarse seek detector allows counting of course tracks during a coarse seek.

D23 is a one-dimensional position sensing detector manufactured by United Detector Technology, Model LSC-5D. The active area on the detector is 5.33 mm long by 2.2 mm wide. The disk plane is imaged onto the detector and fills the entire surface area.

2.0 Read Path to Disk

Figure 9:
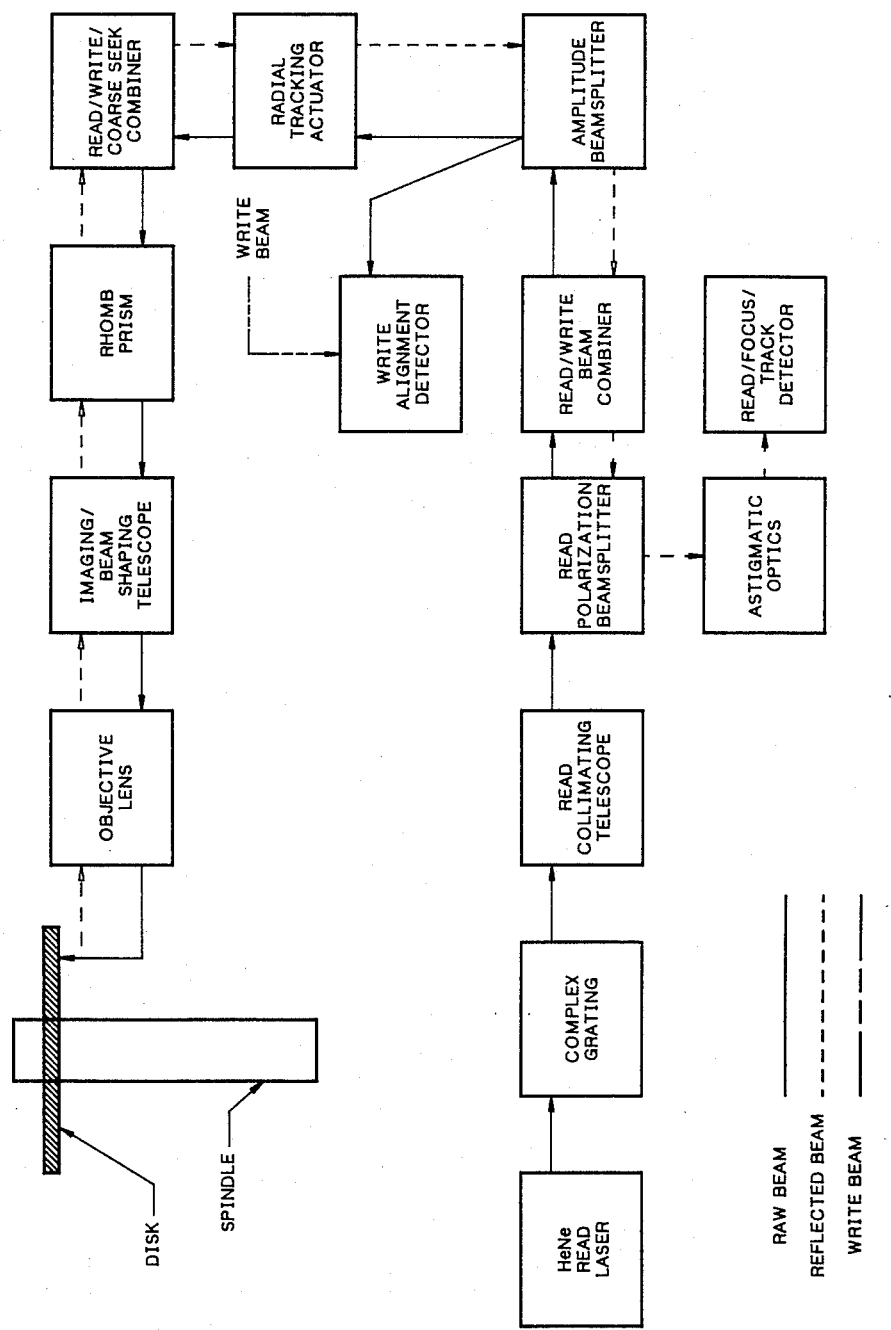

Referring to FIGS. 8 and 9, the 633 nm wavelength HeNe beam leaves the laser housing, is reflected by Mirror M21, transmitted by Filter F21, and reflected by Mirror M22. It is transmitted by the Complex Grating subassembly (GR21 and GR22) which divides the beam into six collimated beams of light which are then expanded by the Read Collimating Telescope (L21 and L22). The light is reflected by Mirror M23, by the Read Beamsplitter (PB1) and the Read/Write Beam Combiner (WB1). It is transmitted by the Amplitude Beamsplitter (AB1) which directs a small percentage of the read light out of the main path through lenses L29 and L30 to the Write Alignment Detector (D22).

The read beams transmitted by the Amplitude Beamsplitter are reflected by the Radial Tracking Actuator mirror (GA1 and M24) which is at an image plane of the Complex Grating. The read light is then reflected by the Read/Write Coarse Seek Combiner (WB2) and Mirror M25, and transmitted through the Rhomb Prism (RH21). It is reflected by Mirror M26 to the Carriage Optics which consists of the Imaging/Beam Shaping Telescope and the Ream-folding Mirror (L23, L24 and M27). Finally, the beams enters the entrance pupil of the Objective Lens (L25) through which they are focused to read data from the disk platter.

3.0 Read Path From Disk

The Read beams reflected from the disk are collected by the Objective Lens (L25) and are transmitted by the Imaging/Beam Shaping Telescope and Beam-folding Mirror (L23, L24 and M27). They are reflected by Mirror M26 and transmitted through the Rhomb Prism (RH1). Once through the prism they are reflected by the Read/Write/Coarse Seek Combiner (WB2) and the Radial Tracking Actuator mirror (GA1 and M24), are transmitted through the Amplitude Beamsplitter (AB1) and reflected by the Read/Write Beam Combiner (WB1). Due to a 90° rotation of polarization caused by the return pass through the Rhomb Prism (RH1), or due to the spatial separation between the incident and returning read beams, the returning read beams are transmitted through the Read Beamsplitter (PB1). The beams are then sent to the Read/Focus/Track Detector train which consists of the Astigmatic Optics (L26, L27 and L28), and Filter F22. The beams are all finally incident upon the Read/Focus/Track Detector (D21).

4.0 Write Path to Disk

Figure 10:
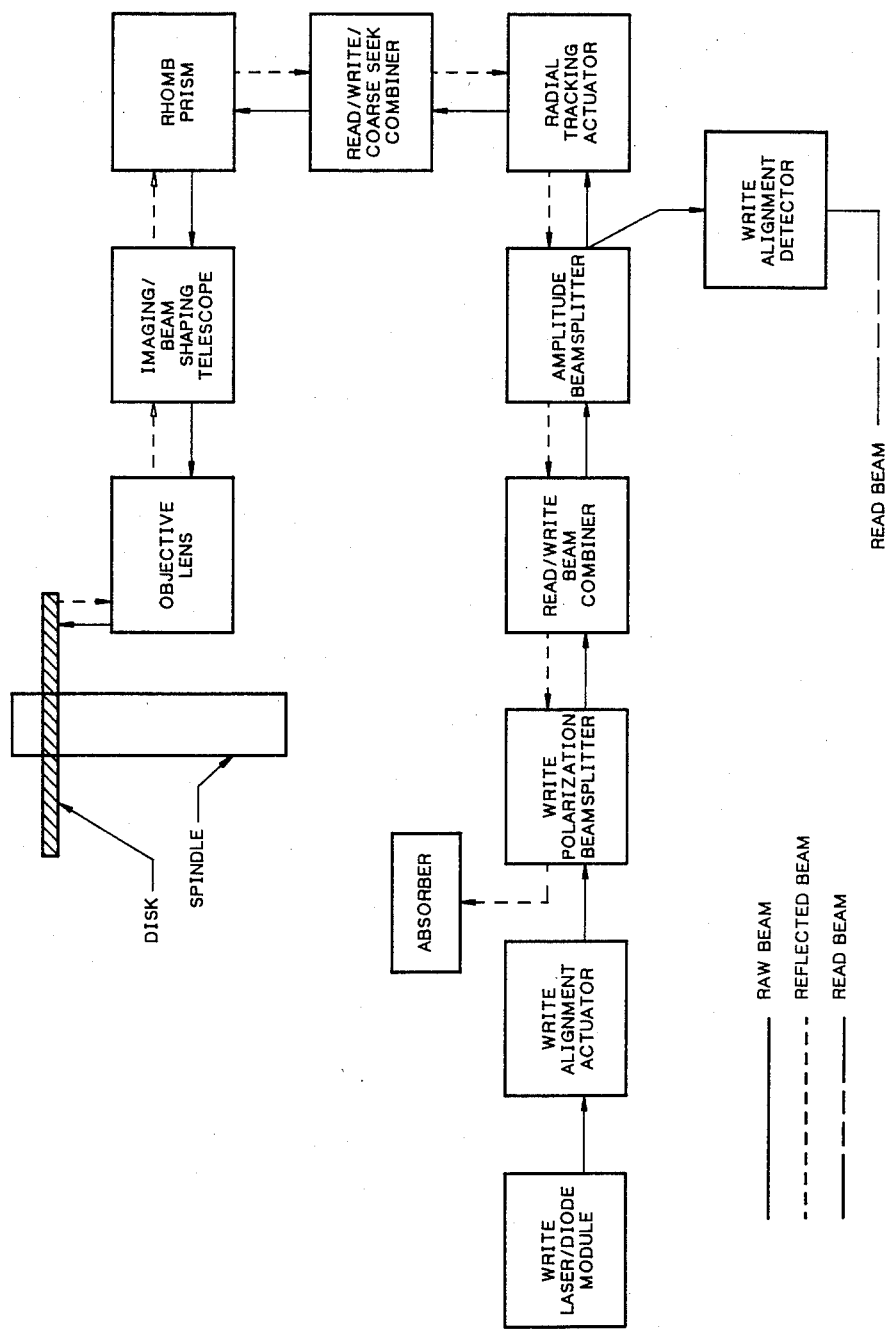

Referring to FIGS. 8 and 10, the write beam originates with the Field Replacement Write Laser Diode Module. The infrared beam is emitted from the diode, is collected and collimated by the Collimator Lens (L34) and is transmitted through Shutter (SH1). The beam is circulated by the Prism Beam Expander subassembly (PR211, M30 and PR212) and is then expanded by the Collimating Telescope (L35 and L36). The expanded beam is reflected by the Write Alignment Actuator Mirror (GA2 and M31) and is transmitted by the Write Beamsplitter (PB2) and the Read/Write Beam Combiner (WB1) so that the read and write beams are on a common path. The combined beams reach the Amplitude Beamsplitter which directs a small percentage of both beams to the Write Alignment Detector.

Write light transmitted by the Amplitude Beamsplitter is imaged onto the Radial Tracking Actuator mirror (GA1 and M24), is reflected by the Read/Write Coarse Seek Combiner (WB2) and Mirror M25, and enters the Rhomb Prism (RH21). The beam is transmitted through the Rhomb Prism and reflected by Mirror M26. It is expanded through the Imaging/Beam Shaping Telescope and Beam-Folding Mirror (L23, L24 and M27) and finally enters the entrance pupil of the Objective Lens (L25) through which it focuses to write upon the disk.

5.0 Write Path From Disk

The Write beam reflected by the disk is collected by the Objective lens (L25), is transmitted by the Imaging/Beam Shaping Telescope and Beam-Folding Mirror (L23, L24 and M27), is reflected by Mirror M26, and transmitted by the Rhomb Prism. Once through the Rhomb Prism it is reflected by the Read/Write/Coarse Seek Combiner and strikes the surface of the Radial Tracking Actuator mirror (GA1 and M24). It is reflected by the actuator and transmitted through the Amplitude Beamsplitter (AB1) and the Read/Write Beam Combiner (WB1). The returning write beam is reflected by the Write Beamsplitter (PB2) and passes onto an Absorber which impedes any further travel of the beam.

6.0 Coarse Seek Path to Disk

Figure 11:
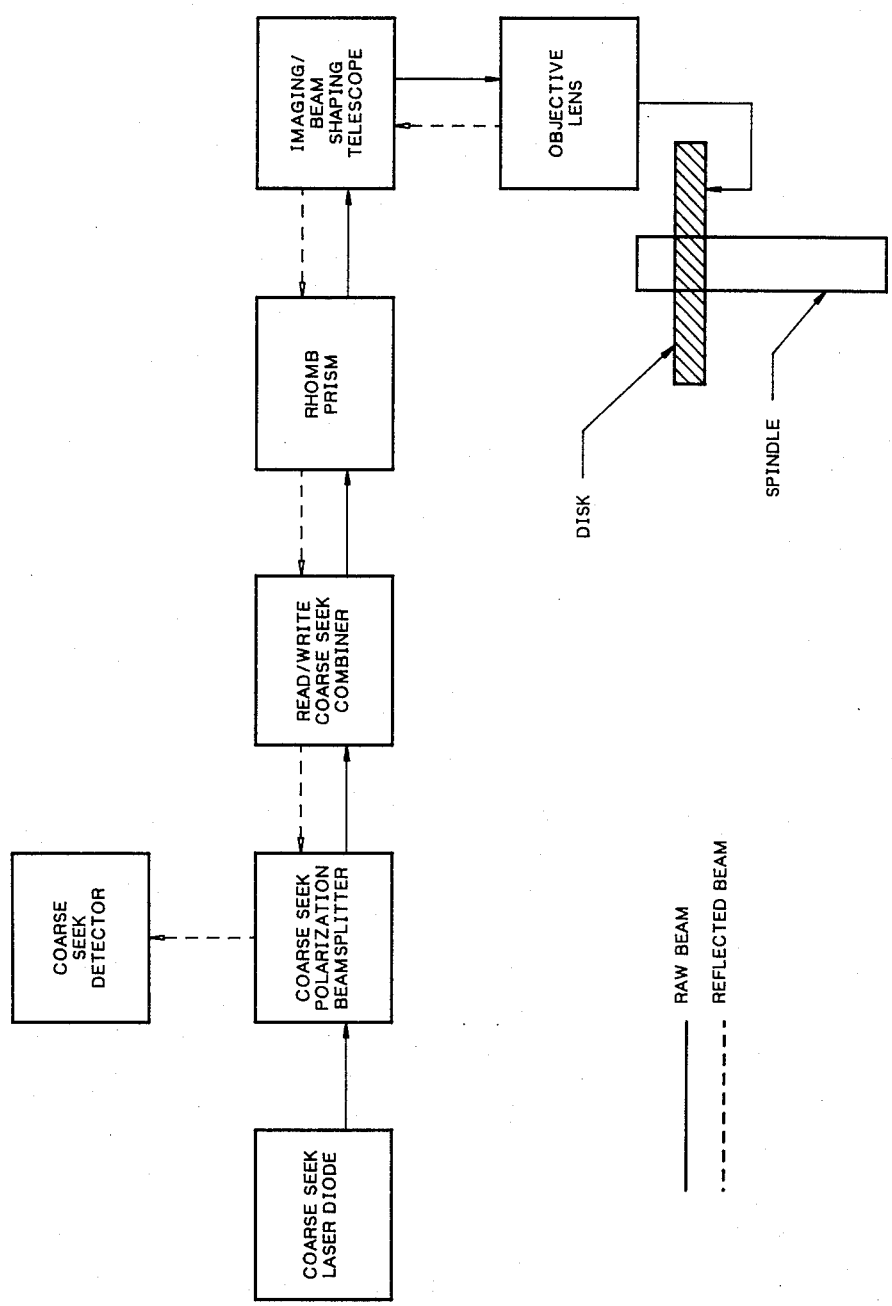

With reference to FIGS. 8 and 11, the Coarse Seek Path to the disk platter originates at the Coarse Seek Laser Diode (CSLD). The 780 nm infrared light is collected by a collimator lens (L31) and a cylindrical lens (L32). It is reflected by Mirror M28 and the Coarse Seek Beamsplitter (PB3). The beam is transmitted by the Retarder Plate (RP1), reflected by Mirror M29 and transmitted through the Read/Write/Coarse Seek Combiner (WB2). The Coarse Seek beam then follows the same path as the HeNe and write laser light to the disk. The beam is transmitted through the Rhomb Prism and is reflected by Mirror M26. It is expanded in the Imaging/Beam Shaping Telescope and Beam-Folding Mirror (L23, L24 and M27) and passes through the Objective lens to reach the disk.

7.0 Coarse Seek Path From Disk

The return Coarse Seek beam comes out of the Objective lens, passes through the Imaging/Beam Shaping Telescope and Beam-Folding Mirror (L23, L24 and M27), and is reflected by Mirror M26. It is transmited through the Rhomb Prism and the Read/Write/Coarse Seek Combiner (WB2) and reflected by Mirror M29. The reflected beam is transmitted through the Coarse Seek Beamsplitter (PB3). The beam passes through Convex Lens L33 and Filter F23 until it is finally incident upon the Coarse Seek Detector (D23).

What is claimed is:

1. A beam alignment system comprising:
   a first optical path through which a first beam is directed;
   a second optical path through which a second beam is directed;
   steering means for controlling the position of one of said first and second beams within its optical path in response to an alignment signal;
   means for joining the second optical path to the first optical path at a desired point along the first optical path, both said first and second beams thereby passing through a shared portion of the first optical path;
   sensing means for sensing the relative alignment between the first and second beams as they pass through the shared portion of the first optical path, and for generating said alignment signal in response to this sensed alignment as compared to a prescribed alignment;
   beam splitting means interposed in the shared portion of the optical path for directing a portion of the first beam from said shared portion of the first optical path to a third optical path, and for also directing a portion of the second beam from said shared portion of the first optical path to the third optical path, the alignment of the first and second beam portions in the third optical path being proportional to the alignment of the first and second beams within the shared portion of the first optical path;
   detector means for generating a first signal indicative of the alignment between the first and second beam portions within said third optical path;
   comparison means for comparing said first signal with a prescribed reference signal and for generating said alignment signal to indicate the error therebetween;
   whereby the first and second beams are maintained in a prescribed alignment relative to each other as they travel along the first optical path.

2. A beam alignment system comprising:
   a first beam directed along a first optical path;
   a second beam directed along a second optical path to a point intermediate along the first optical path, whereat the second beam joins the first beam and passes through a shared portion of the first optical path;
   means for controlling the relative alignment of said first and second beams in response to an alignment signal, whereby the relative alignment of the second beam with respect to the first beam in the shared portion of the first optical path may be controlled;
   means for detecting the alignment between the first and second beams in the shared portion of the first optical path, said alignment detecting means comprising,
   means for directing a portion of the first and second beams from the shared portion of the first optical path to a third optical path, the relative alignment between the portions of the first and second beams in the third optical path being representative of the relative alignment of the first and second beams in the shared portion of the first optical path, and means for measuring the alignment of the beam portions in the third optical path, thereby providing a measurement that is representative of the alignment of the beams in the first optical path;
   means for generating said alignment signal in response to the beam alignment detected by said beam alignment detecting means.

3. The beam alignment system of claim 2 wherein said means for measuring the alignment of the beam portions in the third optical path includes means for measuring the alignment relative to two orthogonal axes associated with said third optical path.

4. The beam alignment system of claim 2 wherein said alignment signal generating means comprises:
   signal processing means for comparing the beam alignment measured by said beam alignment direction means to a desired beam alignment, and for generating an error signal indicative of the difference between the actual and desired beam alignments; and
   drive means for generating said alignment signal from said error signal.

5. The beam alignment system of claim 4 wherein said signal processing means includes means for selectively measuring the alignment of said first and second beams relative to two axes associated with said beam alignment detection means.

6. A beam alignment system for use in an optical storage system that uses a rotating radiation sensitive disk having at least one data track previously written thereon, said system comprising:
   first optical path means for directing a plurality of radiation beams to and from the surface of the rotating disk along a first optical path;
   first beam steering means for jointly steering the radiation beams passing through the first optical path so that the radial positions at which the beams strike the surface of the rotating disk can be controllably and jointly varied;
   alignment means for maintaining the alignment between first and second beams of said plurality of beams at a prescribed distance as said beams pass through said first optical path toward said disk, said alignment means further comprising means for measuring the relative alignment of said first and second beams and for controlling the position of one of said beams as a function of said measured alignment; and
   tracking means coupled to said steering means for maintaining the radial position at which said second beam strikes the rotating disk to be aligned with a data track previously written on said disk;
   whereby said first beam strikes the rotating disk at a position that is aligned with the position at which the second beam strikes the rotating disk.

7. The beam alignment system of claim 6 wherein said alignment means comprises:

a beam splitter placed in said first optical path for directing a portion of the first and second beams traveling towards said disk to a second optical path;

detection means for measuring the relative alignment between the beams traveling trough the second optical path;

signal processing means for generating an alignment signal indicative of the difference between the relative alignment measured by the detection means and a prescribed alignment; and beam positioning means for positioning the first beam in said first optical path in response to said alignment signal;

whereby the position of the first beam relative to the second beam within said first optical path is maintained at a prescribed distance.

8. The beam alignment system of claim 7 wherein said beam positioning means comprises:

third optical path means for directing the first beam to a first optical path; and second beam steering means interposed in said third optical path for steering the position of the first beam within said third optical path, and hence for steering the position of the first beam within the first optical path, in response to the alignment signal generated by said signal processing means.

9. The beam alignment system of claim 6 wherein said second beam comprises a read beam adapted to read data contained in a previously written data track, and wherein said first beam comprises a write beam adapted to mark the radiation sensitive disk with data to be stored in the optical storage system, whereby the write beam writes a new data track on the disk at a position that is aligned with the previously written track.

10. A beam alignment system comprising:

means for directing a first beam along an optical path;

means for directing a second beam along said optical path;

means for splitting a portion of said first and second beams away from said optical path in an orientation that maintains the alignment between said split portions of said first and second beams at an alignment that is proportional to the alignment between the first and second beams traveling through said optical path;

means for detecting the alignment between the split portions of said first and second beams;

means for generating an error signal indicative of the difference between the detected alignment and a prescribed alignment; and means responsive to said error signal for controllably positioning the first beam within said optical path so that a desired alignment is maintained between said first and second beams.

11. A method of positioning and maintaining a first radiation beam at a desired alignment with respect to a second radiation beam comprising the steps of:

(1) directing the first radiation beam to a first optical path so that the alignment of the first beam within the first optical path assumes a desired position;

(2) splitting off a portion of the first beam as it passes through the first optical path and focussing this split-off portion onto a detector, said detector sensing the position at which a beam of radiation falls upon a surface thereof;

(3) directing the second radiation beam through said first optical path;

(4) splitting off a portion of the second beam as it passes through the first optical path and focussing this split-off portion onto the surface of said detector, said second beam portion being split off from the first optical path at an angle that is proportional to the angle at which the first beam portion is split off from the first optical path;

(5) measuring the alignment of the first and second beam portions as they fall upon the surface of the detector;

(6) comparing the aligmment measurement of step (5) to a desired alignment; and (7) using the difference between the measured and desired alignments of step (6) to steer the position of the first beam prior to its entering the first optical path to achieve and maintain a desired alignment between the first and second beams in the first optical path.

12. The beam alignment method of claim 11 wherein step (1) comprises directing the first radiation beam to the first optical path via a second optical path, said second optical path having beam steering means located therein that, in response to control signal, controllably positions the location of the first beam as it enters the first optical path.

13. The beam alignment method of claim 12 wherein step (7) comprises generating an error signal representative of the difference between the measured and desired alignments, and using this error signal to generate the control signal of step (1) that steers and maintains the first beam to a desired position within the first optical path.

14. The bean alignment method of claim 11 wherein the first beam comprises a write beam of radiation and the second beam comprises a read beam of radiatin used in an optical disk storage system, and wherein the write beam is aligned at a desired alignment with respect to the read beam as these beams pass through the first optical path, which first optical path directs these beams to a surface of a rotating disk used with said optical disk storage system, thereby allowing a data track to be written with said write beam on said rotating disk, said data track being a prescribed distance from a previously written data track that is being read and followed by said read beam.

15. The beam alignment method of claim 11 wherein step (5) comprises selectively measuring the alignment of the first and second beam portions relative to two axes associated with the surface of said detector.

* * * * *